United States Patent
Menezes et al.

(10) Patent No.: US 10,220,610 B2
(45) Date of Patent: Mar. 5, 2019

(54) METHOD OF PRINTING A PRINT JOB WITH DIGITAL FINISHING VISUALIZATION IMAGES

(71) Applicant: Océ Holding B.V., Venlo (NL)

(72) Inventors: Vinod J. Menezes, Venlo (NL); Antonius M. Gerrits, Venlo (NL)

(73) Assignee: OCÉ HOLDING B.V, Venlo (NL)

( * ) Notice: Subject to any disclaimer, the term of this patent is extended or adjusted under 35 U.S.C. 154(b) by 23 days.

(21) Appl. No.: 15/596,519

(22) Filed: May 16, 2017

(65) Prior Publication Data
US 2017/0341375 A1 Nov. 30, 2017

(30) Foreign Application Priority Data
May 24, 2016 (EP) .................... 16170956

(51) Int. Cl.
*B41J 29/38* (2006.01)
*B41J 2/045* (2006.01)
(Continued)

(52) U.S. Cl.
CPC ....... *B41J 2/04536* (2013.01); *B41J 2/04586* (2013.01); *G03G 15/50* (2013.01);
(Continued)

(58) Field of Classification Search
None
See application file for complete search history.

(56) References Cited

U.S. PATENT DOCUMENTS

2011/0255099 A1* 10/2011 Harano ............... G06F 3/1208
358/1.5

2013/0163033 A1* 6/2013 Sandler ............... G06F 3/1208
358/1.15

FOREIGN PATENT DOCUMENTS

EP  0 694 832 A2  1/1996
EP  0 694 832 A3  5/1997
(Continued)

OTHER PUBLICATIONS

European Search Report, issued in Priority Application No. 16 17 0956, dated Nov. 8, 2016.

*Primary Examiner* — Matthew Luu
*Assistant Examiner* — Tracey McMillion
(74) *Attorney, Agent, or Firm* — Birch, Stewart, Kolasch & Birch, LLP

(57) ABSTRACT

The present invention relates to a method of printing a print job by an image reproduction system. The print job specifies a printing step on an image receiving medium and a finishing step in or on the image receiving medium. The method comprises the steps of receiving the print job by the image reproduction system and receiving a trigger by a controller of the image reproduction system that the finishing step is not to be performed. In such a case for a digital image comprised in print job data of the print job, at least one digital finishing visualization image of a predetermined visual appearance of a result of the finishing step in or on the image receiving medium is obtained as well as a position of the digital image for merging the obtained at least one digital finishing visualization image with the digital image. The digital image is updated by merging the obtained at least one digital finishing visualization image with the digital image at the obtained position. The updated digital image is printed by the image reproduction system.

12 Claims, 12 Drawing Sheets

(51) Int. Cl.
    *G03G 15/00*     (2006.01)
    *G06K 15/02*     (2006.01)
    *G06F 3/12*     (2006.01)

(52) U.S. Cl.
    CPC .......... *G06F 3/1208* (2013.01); *G06F 3/1256* (2013.01); *G06K 15/026* (2013.01); *G06K 15/1893* (2013.01); *G06F 3/1264* (2013.01); *G06F 3/1282* (2013.01)

(56) References Cited

FOREIGN PATENT DOCUMENTS

| | | |
|---|---|---|
| JP | 2000-343797 A | 12/2000 |
| WO | WO 2015/155160 A1 | 10/2015 |

\* cited by examiner

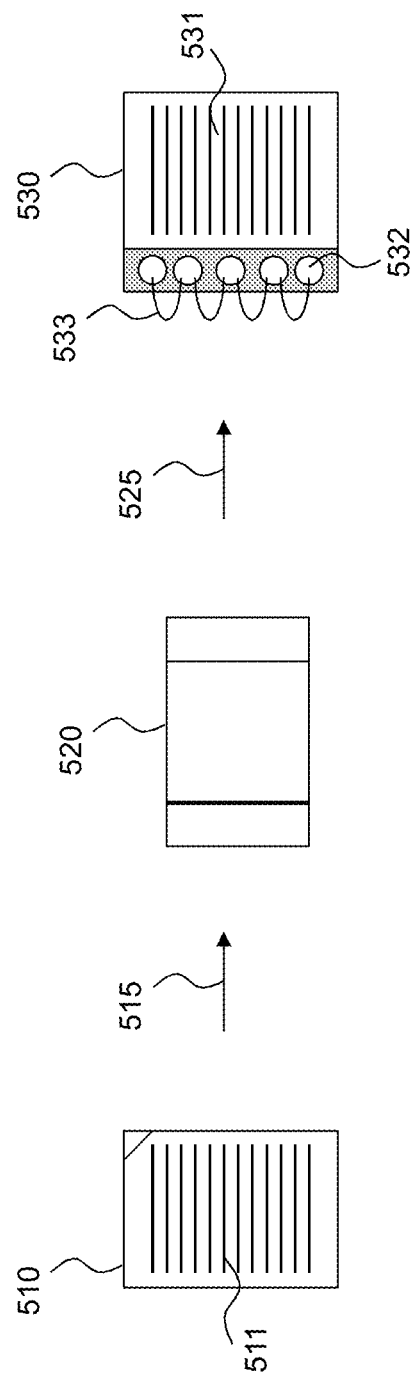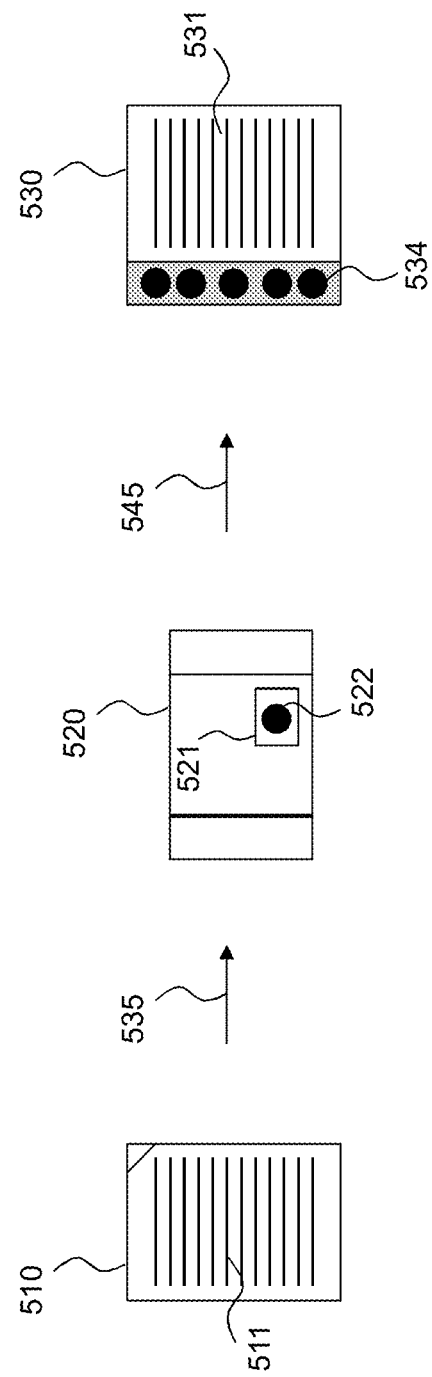

METHOD OF PRINTING A PRINT JOB WITH DIGITAL FINISHING VISUALIZATION IMAGES

TECHNICAL FIELD OF THE PRESENT INVENTION

The present invention relates to a method of printing a print job by an image reproduction system, the print job specifying a printing step on an image receiving medium and a finishing step in or on the image receiving medium, the method comprises the steps of receiving the print job by the image reproduction system and establishing a digital trigger that the finishing step is not to be performed.

BACKGROUND OF THE PRESENT INVENTION

In the image reproduction system, e.g. a printing system, the printing step of the print job is prepared by a controller of the image reproduction step as well as the finishing step. The controller may be capable of preparing a finishing step by an inline finisher or a finishing step by an offline finisher out of a large diversity of inline and/or offline finishers.

Examples of finishing steps comprise: stacking, stapling (specified with number and position), scoring, folding (including different folding patterns), cutting, die cutting, trimming, punching (specified with number and position), drilling, book making, booklet or saddle stitching, ring binding, spiral binding, coil binding, laminating, perfect binding, coating, embossing, and the like. Finishing may be in-line, on-line and/or off-line of the image reproduction system.

A print job may involve a finishing step which is time consuming or uses expensive resources. A proof print job related to such a print job is therefore expensive. A print job specified with a finishing step may be impossible when the appropriate finisher is out of order or not even present inline in the image reproduction system, i.e. an offline finisher. In such cases a digital trigger from inside of the image reproduction system or from outside of the image reproduction system may be established that the intended finishing step is not to be performed.

However, notwithstanding such a case the user still would like to get a feel for a quality of the intended but not to be performed finishing step as much as possible.

SUMMARY OF THE PRESENT INVENTION

It is an object of the present invention to improve the quality check for an intended finishing step.

In order to achieve this object, the method according to the present invention comprises the steps of, for a digital image comprised in print job data of the print job, obtaining at least one digital finishing visualization image of a predetermined visual appearance of a result of the finishing step in or on the image receiving medium, obtaining a position of the digital image for merging the obtained at least one digital finishing visualization image with the digital image, updating the digital image by merging the obtained at least one digital finishing visualization image with the digital image at the obtained position and printing the updated digital image by the image reproduction system.

The at least one digital finishing visualization image is defined as a digital image which visualizes the result of the finishing step in or on the image receiving medium and is printed on the image receiving medium.

Auxiliary finishing marks like trim marks, cut marks and folding marks as known from the prior art to indicate where to finish—respectively to trim, cut and fold—a printed sheet do therefore not fall under the definition of a digital finishing visualization image.

The digital finishing visualization image is beforehand generated and at the disposal of the controller of the image reproduction system, i.e. stored in memory of the controller. The digital finishing visualization image may be generated by simulating the finishing step on the controller by print job and applying the digital finishing visualization image on each sheet of the print job.

The digital finishing visualization image may be generated by scanning a real finished print job (printed on a printer which has the real finisher), extracting and saving the digital finishing visualization images from the scanned print job.

The digital finishing visualization image may be generated by allowing an operator of the image reproduction system to enter the finishing specifications manually or to create and upload a finishing visualization image which can be applied on the sheets to be printed.

Other ways of generating the digital finishing visualization image may be envisioned as long as the digital finishing visualization image is a digital representation of the finishing step.

By printing the updated digital image comprising the at least one digital finishing visualization image merged with the digital image, an impact of the finishing step of the print job is visible and checkable on the receiving medium for the user without actually using the finisher. The step of printing the digital finishing visualization images replaces the step of actual finishing. The one or more printed digital finishing visualization images are helpful to know the capability of the finisher and the impact of the finisher even when the finisher is not available or the finisher is available but the finishing step is time consuming or cost of finishing resources, i.e. receiving media, is high.

A printed example according to the method of the present invention may be more insightful than a preview or soft proofing on a computer screen, since preview capability may be limited, not always present or incorrect. If the print job owner, for example at a different geographical location, has to review a proof print, mailing him a few pages with printed digital finishing visualization images is more feasible than showing him digital previews. As the print job owner is interested in print quality, he can verify a quality of the receiving medium, color of the receiving medium, color of the printed images, and he can also see how the finishing step would end up on the output.

The method may also be applied if the image reproduction system is not capable of performing the finishing step of a print job. For example, the image reproduction system will allow the finishing step even when a tray to which the document is printed is not capable of handling such a finishing step. A print controller of the image reproduction system will print to such a tray with the at least one digital finishing visualization image of the intended finishing step instead of blocking such a print job being printed to the tray.

According to an embodiment the print job is at least one out of a first print job comprising a specification of the finishing step that does not result in printing any first auxiliary finishing mark in the printing step, and a second print job comprising a specification of the finishing step that does result in printing a second auxiliary finishing mark in the printing step, the second auxiliary finishing mark deviating qua form and/or qua position from the at least one digital finishing visualization image.

An example of the first print job is a print job for printing and stapling a number of sheets of a document or a print job for printing a number of sheets of a document which needs to be punched with punch holes.

An example of the second print job is a print job with cut marks, trim marks and/or folding marks.

According to an embodiment the at least one digital finishing visualization image exaggerates the predetermined visual appearance of the result of the finishing step in or on the image receiving medium. The exaggeration may be helpful in discerning the printed digital finishing visualization images from the printed digital image in the printed updated digital image.

According to an embodiment the at least one digital finishing visualization image is printed completely inside the image boundaries of the digital image. This is advantageous when the printed updated digital image occupies only a part of a printed sheet since it is easily discernible from finishing marks like cut marks, trim marks and folding marks outside the boundaries of the digital image.

However, according to an alternative embodiment the digital finishing visualization image is at least partially printed outside the boundaries of the digital image. For example, when a digital image is printed on a larger sheet for trimming and spiral binding afterwards, a digital spiral binding visualization image may be obtained and printed on the larger sheet at least partially outside the boundaries of the original digital image to be printed.

According to an embodiment the at least one digital finishing visualization image represents a result of a finishing step for a number of sheets and the method comprises the step of printing at least one digital finishing visualization image on each sheet, wherein a digital finishing visualization image for the finishing step printed on one sheet differs from a digital finishing visualization image for the same finishing step printed on another sheet. For example a stapled sheet may be front sheet, a middle sheet or a back sheet of a document which each have a different digital finishing visualization image in line with the result of the stapling step on the respectively sheet. Another example is a digital folding visualization image of a gutter taking into account a gutter width variation when folding a number of sheets.

According to an embodiment the trigger is at least one out of an external trigger received from outside of the image reproduction system and an internal trigger received from inside of the image reproduction system. The external trigger may be one out of an external trigger received from an offline finisher and an external trigger received by means of a remote user interface of the image reproduction system or by means of a printer driver application for the image reproduction system. The remote user interface and/or the printer driver application are configured to receive user instructions from a user of the image reproduction system.

An internal trigger may be received from a local user interface of the image reproduction system of from an inline finisher via a network connection. The inline finisher may be broken or not capable of performing the finishing step, for example the document may be too thick to staple.

According to an embodiment the method comprises the step of rasterizing the digital image and the digital finishing visualization image before the updating step. The rasterizing step may be performed by a rasterizing image processor (RIP) being internal in or external to the image reproduction system. According to an alternative embodiment the method comprises the step of rasterizing the updated digital image, i.e. after merging the obtained at least one digital finishing visualization image with the digital image at the obtained position.

According to an embodiment the step of obtaining a position of the digital image for merging the obtained at least one digital finishing visualization image with the digital image comprises the sub-step of receiving the position from a finisher configured to perform the finishing step.

According to an embodiment the step of obtaining the at least one digital finishing visualization image comprises the step of receiving image properties to be applied to the at least one digital finishing visualization image from a finisher which is capable to execute the finishing step. For example, a size and/or a color of tape binds or a size and/or a color of staples, a shape of a punch hole may be received from the finisher.

The present invention also relates to an image reproduction system for processing a number of image reproduction jobs, comprising a controller adapted to perform the method according to the present invention.

According to an embodiment of the image reproduction system according to the present invention the image reproduction system comprises or is connected to at least one finisher.

The present invention also relates to a non-transitory recording medium comprising computer-executable program code configured to instruct a computer to perform a method according to the present invention.

BRIEF DESCRIPTIONS OF THE DRAWINGS

Embodiment examples will now be described in conjunction with the drawings, wherein:

FIG. 5A shows a prior art print job with a finishing step

FIG. 5B shows the same print job as in FIG. 5A using digital finishing visualization images according to the present invention;

DETAILED DESCRIPTION OF THE EMBODIMENTS

The embodiments are explained by taking in the examples an image reproduction system comprising a print head or print assembly, like an inkjet printing system or an electrophotographical printing system. In principal an image reproduction system in which any kind of print medium, any kind of marking material, and, if needed, any kind of finishing material is to be loaded and the kind of marking material is to be printed on the kind of print medium may be configured to use the methods according to the embodiments of the present invention.

Figure 1:
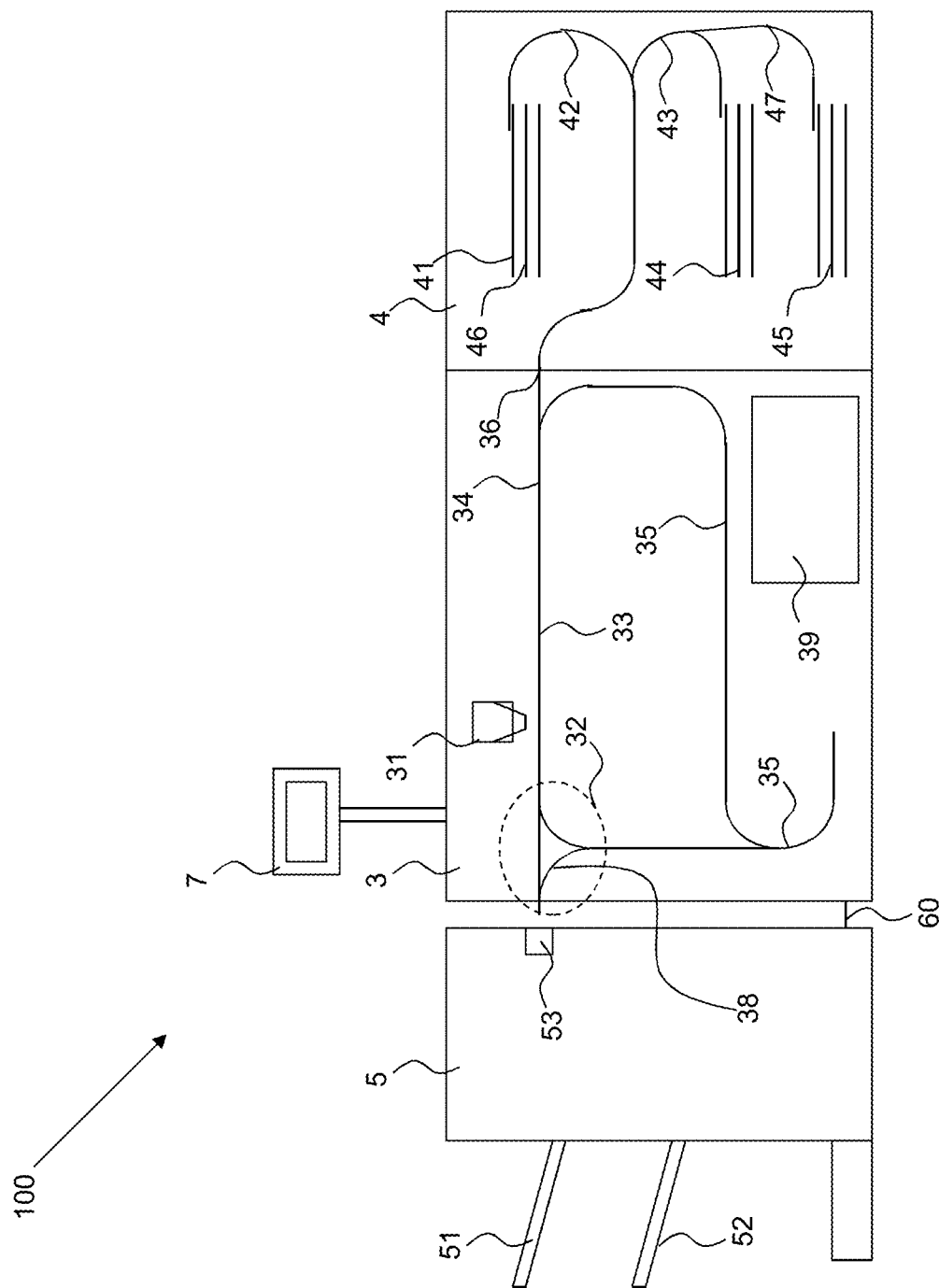
FIGS. 1-2 are diagrams of an image reproduction system to which the present invention is applicable.

FIG. 1 shows schematically an exemplary image reproduction system 100 in which the method according to the present invention is applicable. The image reproduction system 100 comprises an output section 5, a print engine and control section 3, a local user interface 7 and an input section 4.

The output section 5 comprises two supply material output holders 51, 52 for holding printed print medium. The printed print medium is transported from the print engine and control section 3 via an inlet 53 to the output section 5. The output section 5 is digitally connected by means of a cable 60 to the print engine and control section 3 for bi-directional data signal transfer. Other supply material output holders may be envisioned, for example a supply material output holder for residuals of ink or toner or a supply material output holder for waste paper in case of drilling actions, cutting actions or perforating actions. Depletions of such a supply material output holder may be scheduled according to the method of the present invention. The output section 5 may comprise an inline finisher like a stapler, a perforator, a puncher, a folder, a binder, etc. Off line finishers may be added to the image reproduction system for off line actions which may also be represented by means of at least one digital finishing visualization image.

The print engine and control section 3 comprises a print engine and a control unit 39 for controlling the printing process. The control unit 39 is a computer or server or a workstation, connected to the print engine and connected to the digital environment of the printing system, for example a network for transmitting a submitted print job to the printing system. The control unit 39 also comprises in storage a media catalogue software system (not shown) for print media which are approved for use by the image reproduction system 100. The control unit 39 also comprises the receiving section (not shown) for receiving print jobs digitally submitted to the image reproduction system 100. In case that the output section 5 comprises an inline finisher, the print engine and control section 3 comprises in storage specifications of the inline finisher and controls the actions of the inline finisher.

The print engine comprises a print head or print assembly 31 for ejecting or fixing marking material to the print medium and a paper path 34, 32, 35 for transporting the print medium from an entry point 36 of the print engine and control section 3 to the inlet 53 of the output section 5. The print head or print assembly 31 is positioned near the paper path section 34. While a print medium is transported along the paper path section 34, the print medium receives the marking material from the print head or print assembly 31. A next paper path section 32 is a flip unit for selecting a different subsequent paper path for simplex or duplex printing of the print medium. The flip unit 32 may be also used to flip a printed sheet of print medium after printing in simplex mode before the printed sheet leaves the print engine and control section 3 via a curved section 38 of the flip unit 32 and via the inlet 53 to the output section 5.

When the print medium has to be printed in a simplex mode, the print medium may directly be transported via the flip unit 32 to the inlet 53 of the output section 5. When the print medium has to be printed in a duplex mode, the print medium is transported via the flip unit 32 to the other paper path section 35 for turning the print medium in order to switch front side and back side of the sheets. The sheets are then transported to the paper path section 34 again for printing on the rear side of the sheets by means of the print head or print assembly 31.

The input section 4 comprises a plurality of print medium input holders 44, 45, 46 for holding the print medium before transporting the sheets 41 of the print medium to the print engine and control section 3. Sheets 41 of the print medium are guided from the print medium input holders 44, 45, 46 by guiding means 42, 43, 47 to an outlet 36 for entrance in the print engine and control section 3.

FIG. 1 shows a plurality of print medium input holders. The present invention, however, also applies to an image reproduction system for only one print medium input holder. FIG. 1 shows a plurality of print medium output holders. The present invention, however, also applies to an image reproduction system for only one print medium output holder.

Figure 2:
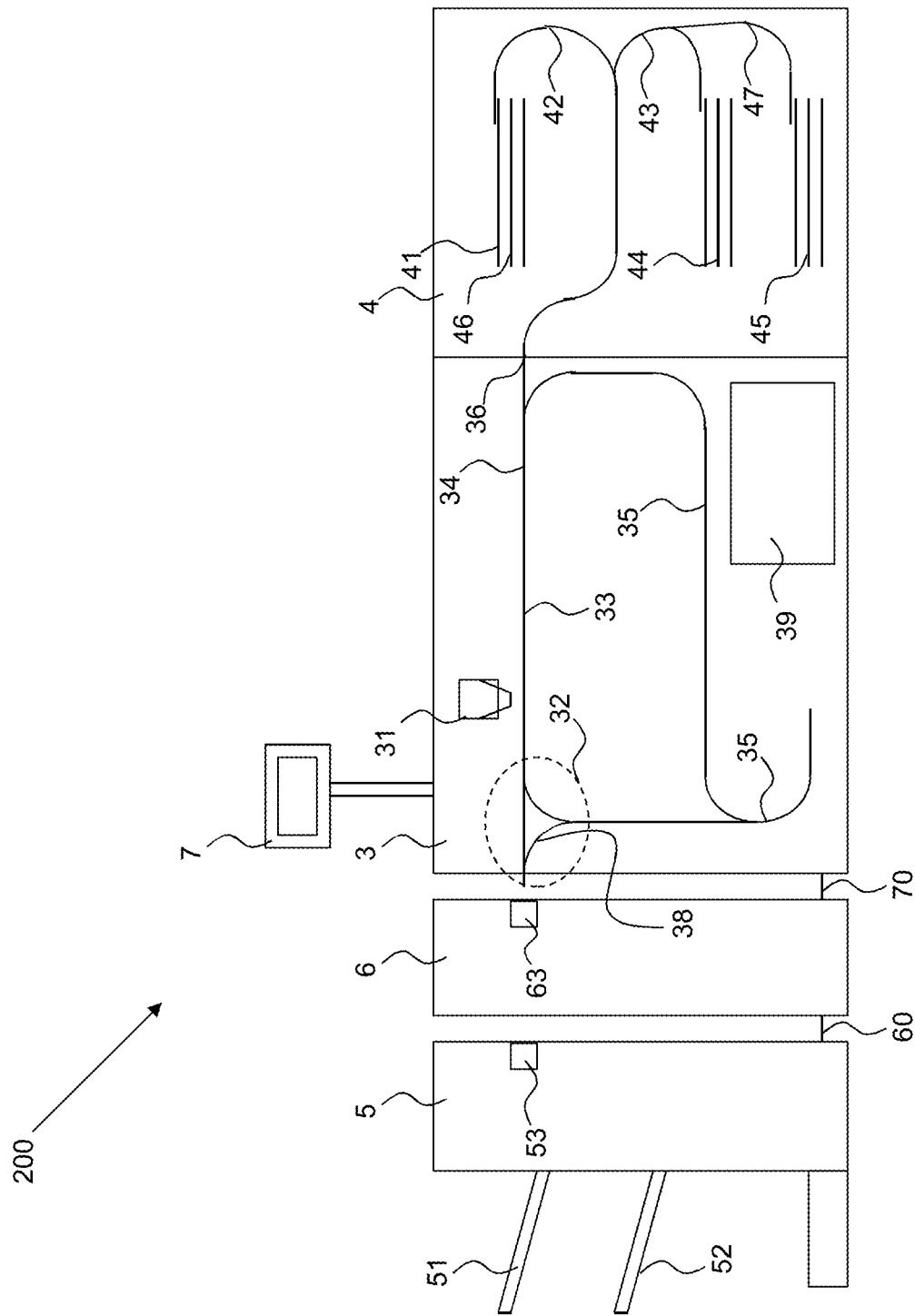

FIG. 2 shows another embodiment of an image reproduction system 200 according to the present invention. A finisher 6 is positioned between the print engine and control section 3 and the output section 5. The finisher 6 may be a device provided by the manufacturer of the print engine and control section 3. In that case, detailed information on the properties and capabilities of the finisher 6 will be available in the control unit 39. As an alternative, the finisher 6 may be an OEM finisher from another manufacturer which communicates with the control unit 39 according to a standard DFD (Document Finishing Device) protocol via a digital connection 70. In that case, only limited information on the properties of the finisher 6 may be available in the control unit 39. At least, however, the control unit 39 receives a signal when the finisher 6 is ready to process at least one printed sheet, when the finisher 6 is not able or not ready to process the at least one printed sheet or when a finishing process for a document or a set of documents has been completed.

When one or more print jobs are received at the control unit 39, a specific module in the control unit 39, which is called a scheduler, sorts the received jobs by their priorities and arranges them in a print queue which determines the sequence in which the jobs are to be processed. Further, based on more or less detailed information on the processing operations to be performed in the print engine and control section 3 and the finisher 6 of image reproduction system 200 drawn in FIG. 2 or the inline finisher in the image reproduction system 100 drawn in FIG. 1, the scheduler calculates for each job a first estimate of the time that will be needed for processing the job. Based on these estimates, the scheduler calculates a time schedule which will be displayed on the local user interface 7 (and possibly also on remote user interfaces).

Figure 3:
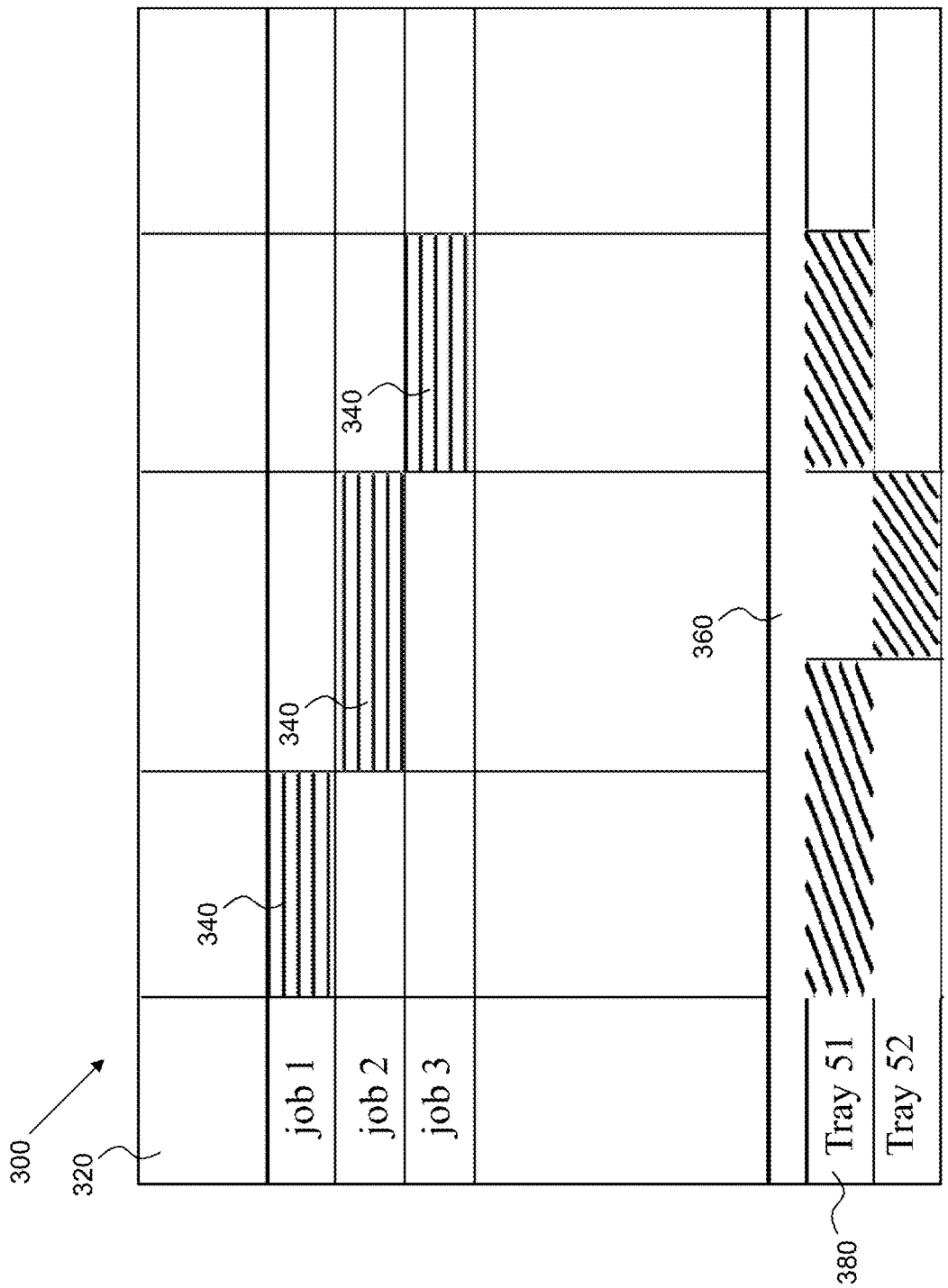
FIG. 3 shows an example of a job schedule as displayed on user interface of the image reproduction system according to the present invention.

FIG. 3 shows an example of such a time schedule 300 for the simple case that only three print jobs "job 1", "job 2", "job 3" are waiting in the print queue. A column 320 on the left margin of the display screen identifies the print jobs, and a time bar 340 is displayed for each job. The time bars 340 symbolize the expected duration of the respective print job and indicate the start and end times of the jobs. These times can be read on a time scale 360 that is displayed below the time bars. A few lines 380 below the time scale 360 indicate the output trays 51, 52 and the times when these trays are expected to be busy with discharging printed copies. Thus, a user who has entered one of the print jobs may see at a glance when his job can be expected to be ready and from which tray the copies may be fetched.

Figure 4:
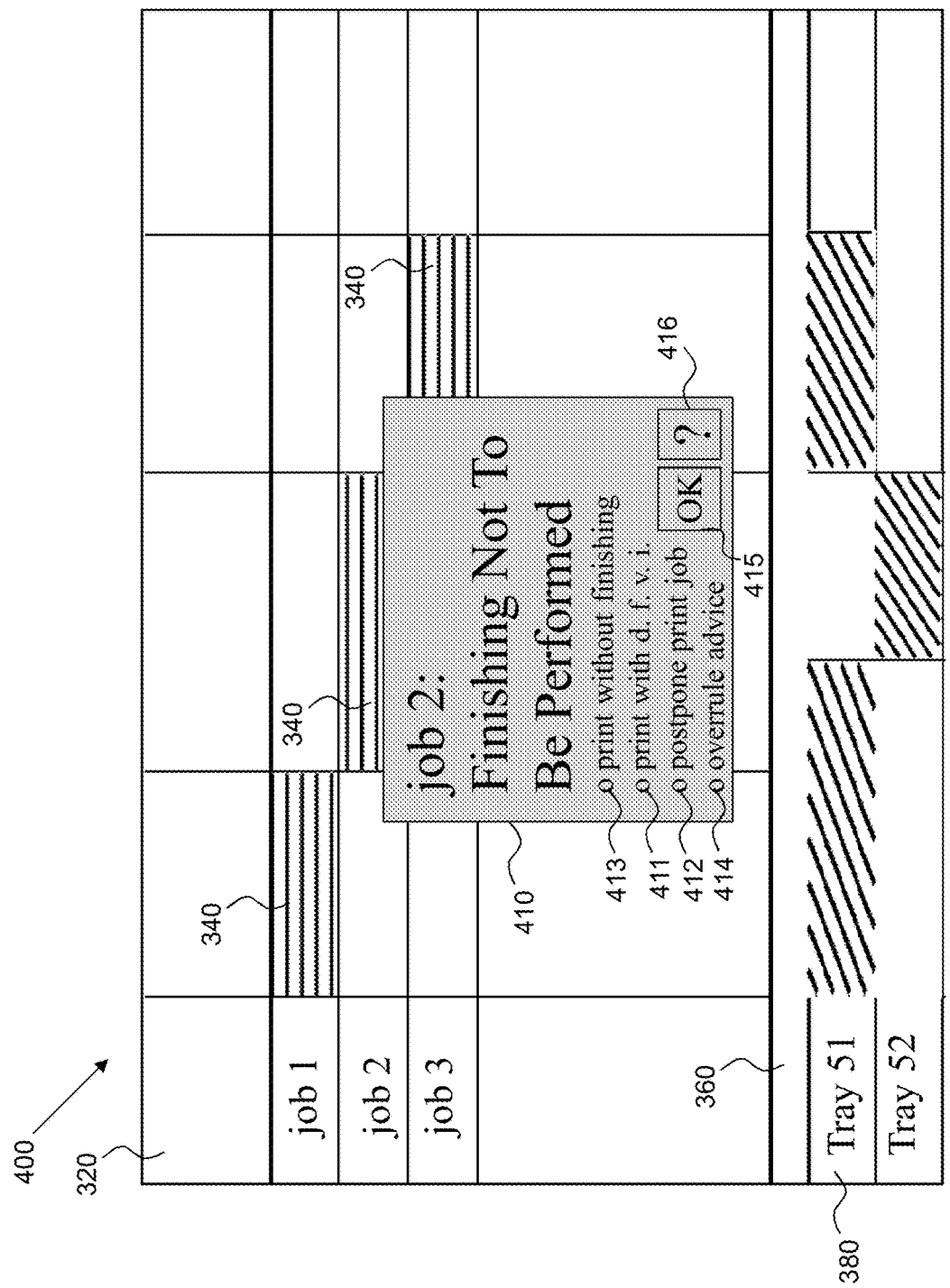
FIG. 4 shows an example of a user interface screen of the job schedule.

FIG. 4 shows a user interface screen 400 of the time schedule when the scheduler has calculated expected timings of certain events which require a decision from the user or the operator of the printing system when a print job with a finishing step is involved. For example, the control unit has established from the print job specifications of print job named "job 2" that the printed sheets need to be finished by the finisher 6 of image reproduction system 200 or by the inline finisher of image reproduction system 100. If the control unit 39 receives a digital trigger that the finishing step can not be performed, the print job named "job 2" will be accompanied in the scheduler by means of a popup menu 410. The popup menu 410 has at least a first option 411 to print the print job with digital finishing visualization images (d.f.v.i.) according to the present invention. The popup menu 410 may also comprise a second option 412 to postpone the printing of the print job, a third option 413 to print the print job without finishing at all and/or a fourth option 414 to overrule the advice if possible and if not leading to deficiencies in the output of the print job. The fourth option 414 will be disabled or not shown if overruling is not possible or leading errors like system errors, print errors, finishing errors, etc. When the user has selected an option out of the first option 411, the second option 412 if present, the third option 413 if present and the fourth option 414 if present he may confirm the selected option to be executed by means of a confirmation button 415.

The popup menu 410 also comprises an information button 416. The information button 416 may be activated when the user wants to have information about a reason why finishing for the print job named "job 2" is not to be performed or about an advice—in less severe circumstances—to not finish the print job named "job 2".

The features introduced in the popup menu 410 may also be integrated in a user interface window which is dedicated to the print job queue. Each print job in the print job queue may be selected to open a print job property screen for changing print job properties. The options in the popup menu 410 may then be integrated in print job property screen.

The digital trigger may be generated by the finisher and send to the control unit 39, for example, if the finisher is not ready or out of order. The digital trigger may be generated by the finisher 6 and/or the control unit 39 when the finishing step for the print job does not match with the capabilities of the finisher, for example the finishing step is a stapling step and the number of sheets of the print job to be printed is too much to be stapled in one time, or when there is no appropriate finisher present connected to or inside of the image reproduction system 100, 200.

When the first option 411 is selected, the finishing step specifications of the print job named "job 2" are used to determine which at least one digital finishing visualization image is to be obtained from memory of the control unit 39. Also a position of the at least one digital image to be printed according to the print job named "job 2" and a position of the at least one digital finishing visualization image therein is obtained from the control unit 39. A digital image to be printed is updated by merging the obtained at least one digital finishing visualization image with the digital image at the obtained position. The updated digital image is then printing by the image reproduction system 100, 200 without an actual finishing.

In another embodiment the trigger is established by the control unit 39 based on a kind of receiving medium required for the print job, a controller/finisher estimated finishing time of the finishing step of the print job and an indication that a proof print is needed for the print job. Such a print job is a candidate print job for showing the popup menu 410 on the user interface 7 of the image reproduction system 100, 200 (and possibly also on any appropriate remote user interface). In this case also the option 414 may be shown in the popup menu 410 in order to overrule the advice of printing with digital finishing visualization images by just printing as well as finishing by the finisher.

The operator may also limit the number of pages to be printed. Thereto the job properties of the appropriate print job, for example the print job named "job 2", may be edited on a job properties menu (not shown) which appears when clicking on the appropriate print job in the first column 320. By printing digital finishing visualization images on a few sheets, an impact of the finishing step on the print job is visualized without using finishing resources and without printing the entire print job, saving receiving medium.

For example, if a printer owner is using a productive printer and wants to print a proof job which is stapled at a set of 200 pages, he can preview the printed digital stapling visualization images on the printed sheet he is interested in, by just printing one sheet with the digital stapling visualization image instead of 200 sheets. Even a tray may be used which does not support stapling, and proof printing may even take place during the time that a production job—by using interleave printing for example—is busy at the stapling device.

FIG. 5A shows an example of a well-known print job for printing a digital multi-page document 510 comprising an image 511 and for finishing with punching holes and binding according to the prior art. The print job is submitted (515) to a printer 520 to be printed and really finished (525). The output is a printed number of sheets 530 comprising a printed image 531 and having punch holes 532 and binding material 533 to bind the number of sheets 530.

FIG. 5B shows an example of a print job according to the present invention for printing the digital multi-page document 510 comprising an image 511 by means of a digital finishing visualization image 522. The print job is submitted (535) to the printer 520 to be printed (545) with the digital finishing visualization image 522 instead of a real finishing step. The digital finishing visualization image 522 appropriate for visualizing the result of a punch hole intended to be used in the print job is fetched from memory 521 of the printer 520 as well as the appropriate positions of the digital finishing visualization image 522 in the updated image 511 according to the method of the present invention. The output is a printed number of sheets 530 comprising a printed updated image 531 which comprising printed digital finishing visualization images 534 according to the digital finishing visualization image 522. The size of a printed digital finishing visualization image 534 is equal to the size of the result of a real finishing step like the punch hole 532 in FIG. 5A or exaggeratedly larger.

Figure 6A:
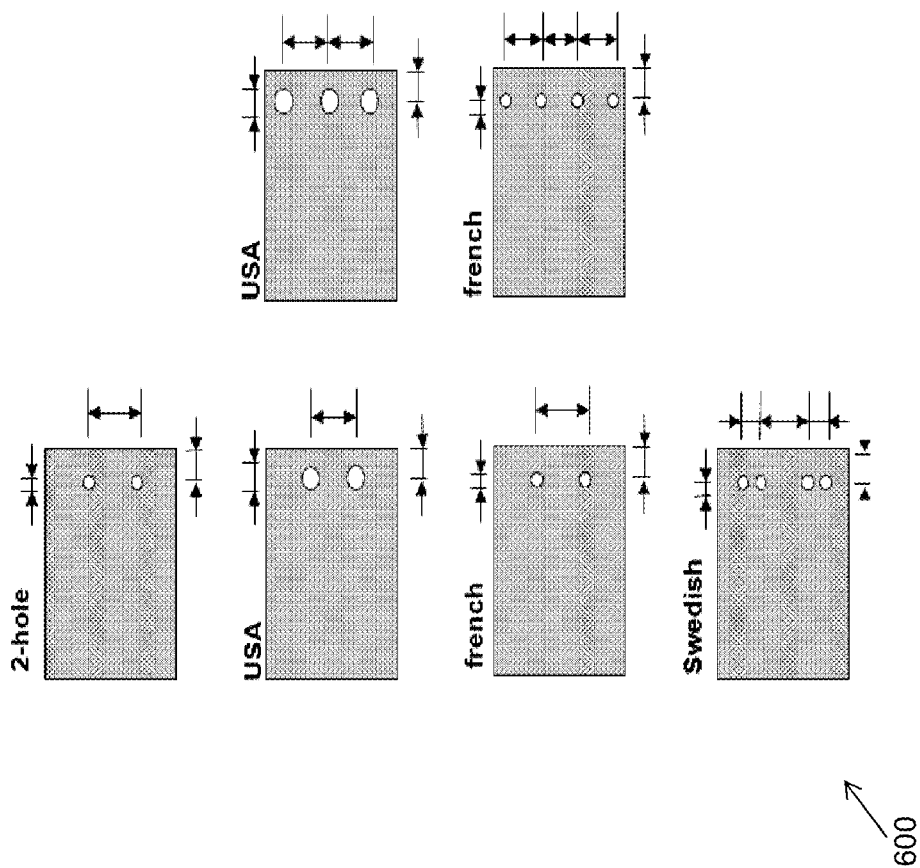
FIG. 6A shows possible die sets for a finisher to be visualized by means of digital finishing visualization images according to the present invention.

A printer owner may use the control unit 39 which is configured to print digital finishing visualization images for selecting a new finisher or an extension to an existing finisher. For example, the printer owner may print digital finishing visualization images of possible die sets 600—as shown in FIG. 6A—for a puncher he is intended to buy. A die set may be chosen that is needed based on the print job requirements of the print jobs of the printer owner. By using the possibility of printing the digital finishing visualization images, the printer owner will encounter less surprises and it is easy for him to make a choice out of die sets 600 by visualizing the digital finishing visualization images on the real print job.

So the sales team of the finisher can easily communicate with the printer owner owning the printer control unit 39 which can print the digital finishing visualization images by asking the printer owner to choose the desired finisher by printing the digital finishing visualization images during the print job.

Digital finishing visualization images may be printed on a printer which does not have a finisher in a configuration or when an inline finisher is out of order and later offline finishing may be performed.

Figure 6B:
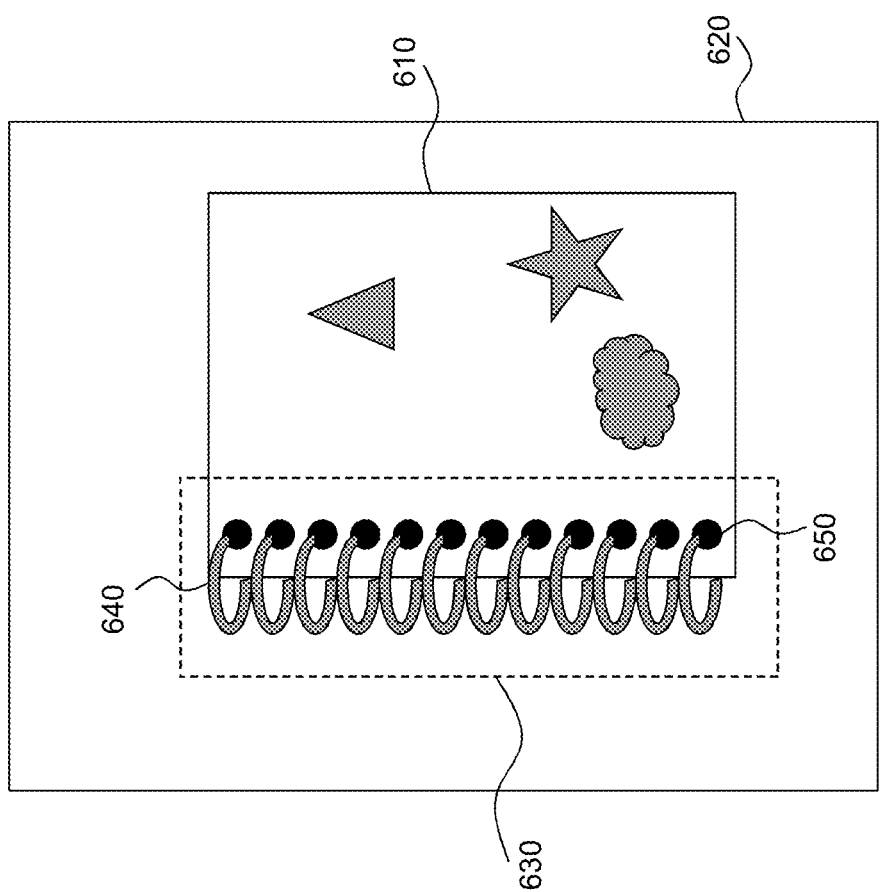
FIG. 6B shows an example of a digital finishing visualization image according to the present invention which is to be printed outside the boundaries of the original digital image.

FIG. 6B shows an example of a digital finishing visualization image according to the present invention which is intended to be printed at least partially outside the boundaries of the original digital image to be printed. A digital image 610 is printed on a larger sheet 620 for trimming and spiral binding afterwards, a digital spiral binding visualization image 630 is obtained and printed on the larger sheet 620 at least partially outside the boundaries of the printed digital image 610. A spiral 640 in the digital spiral binding visualization image 630 may have a color, a size and a form according to the finishing specifications of the print job. Punch holes 650 for the spirals 640 may be part of the digital spiral binding visualization image 630 or may be separately obtained from a digital punch hole visualization image and merged with the digital spiral binding visualization image—without punch holes—and the digital image 610 to be printed.

Figure 7:
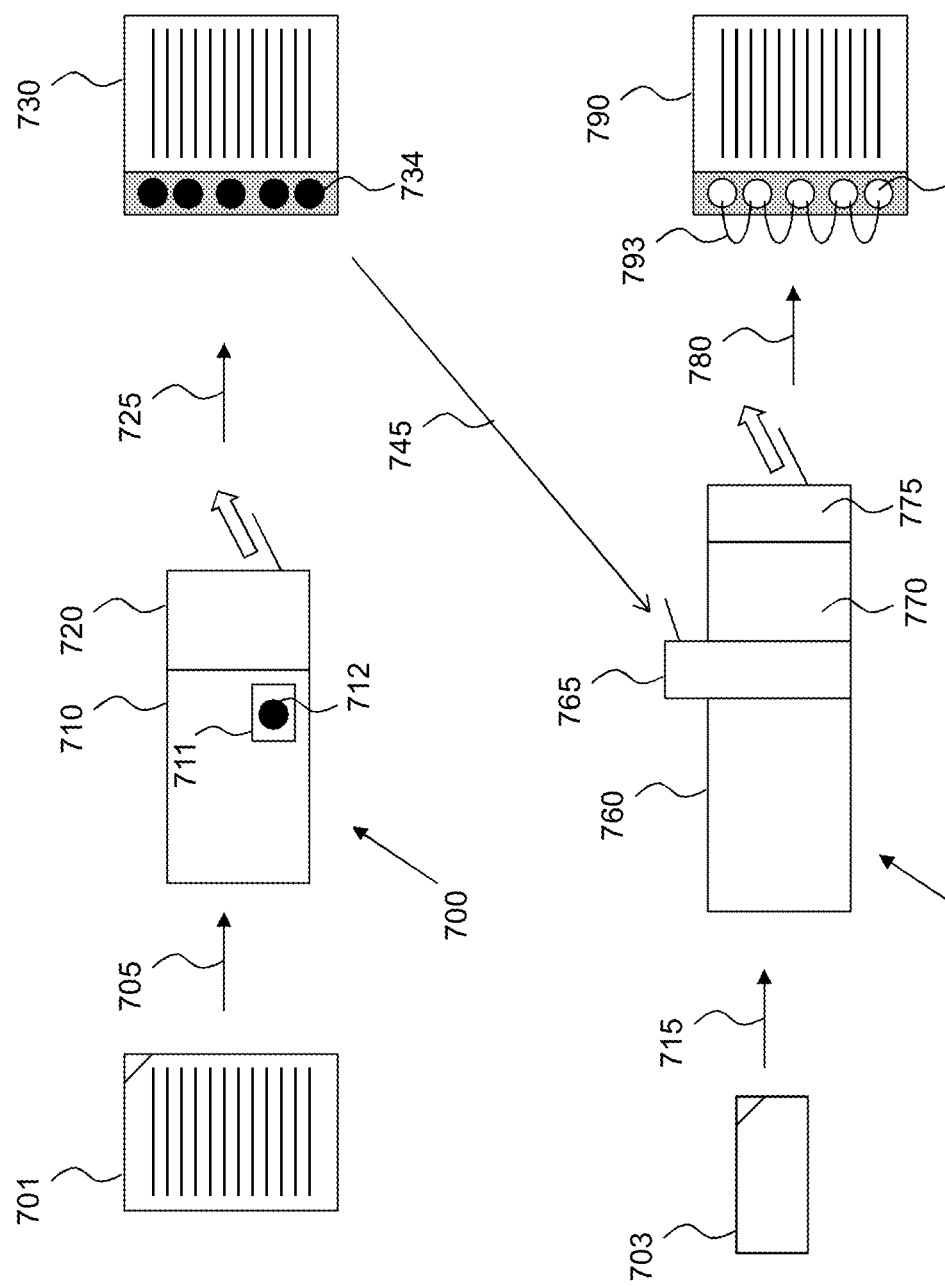
FIG. 7 shows printer configurations for which the method according to the present invention is applicable.

FIG. 7 shows a first printer configuration 700 and a second printer configuration 750. The first printer configuration 700 comprises a slow color printer 710 with a first finisher 720. Memory of a control unit 711 of the slow color printer 710 is loaded with digital finishing visualization images 712.

The second printer configuration 750 comprises a high speed black-and-white printer 760 with an inserter 765, a punch hole binder 770 and a second finisher 775.

When a color print job 701 is submitted 705 to the slow color printer 710 which requires a finishing step 780 of punch hole binding, the operator may print 725 the digital punch-hole visualization image 712 according to the present invention on the slow color printer 710. The operator is then able to already check correctness of the punch hole positions 734 (intended to be made on the high speed black-and-white printer 760) on the color prints 730. The operator inserts 745 the color prints 730 in the inserter 765 of the high speed black-and-white printer 760 and selects 715 a process command 703 of input of media from the inserter 765 and a use of the real punch hole binder 770. The punched output is transferred to the second finisher 775 resulting a printed 790, punched 792 and bound 793 document.

This is an advantageous way of working when the punch hole binder 770 is rarely used for color print jobs. Thus the printer owner can manage easily with a single finisher 770 for two printers 710, 760. Also it is avoided in this particular case that the high speed black-and-white printer 760 is loaded with the color print job 701 when it is established from the printed digital punch-hole visualization images 734 that the punch holes will be placed incorrectly.

A finisher manufacturer may confront a new finisher to the market in an early stage by providing a software update to the printer control unit 711, 39 to print digital finishing visualization images of the finisher under prototype. This way of working will help the finisher manufacturer to get early feedback on the finisher type and communicate the feedback to the printer owners. Currently, the finisher manufacturer may send a sample finished job to a limited number of customers since it takes time and resources to print and mail the sample job. By using digital finishing visualization images any number of customers may try the digital finishing visualization images of a finisher under prototype and the customers of finishers may use their own print jobs to test.

The present invention may also be used to test consistency of a finisher during manufacturing of the finishers. The digital finishing visualization images may be used as a standard reference to evaluate the quality of the finishers in a manufacturing line of the finishers. The fact that the digital finishing visualization image is not visible after the real finishing by a real finisher—in case an equal size of the digital finishing visualization image is set as the real finishing result in the printed image—indicates that the finisher is well adjusted and provides good quality of finishing. To allow an acceptable drift in a finisher, the digital finishing visualization images should be in an acceptable range.

According to an embodiment of the present invention finishing visualization images representing a result of a finishing step are printed on a number of sheets in such a way that a finishing visualization image for the finishing step printed on one sheet differs from a finishing visualization image for the same finishing step printed on another sheet.

Figure 8:
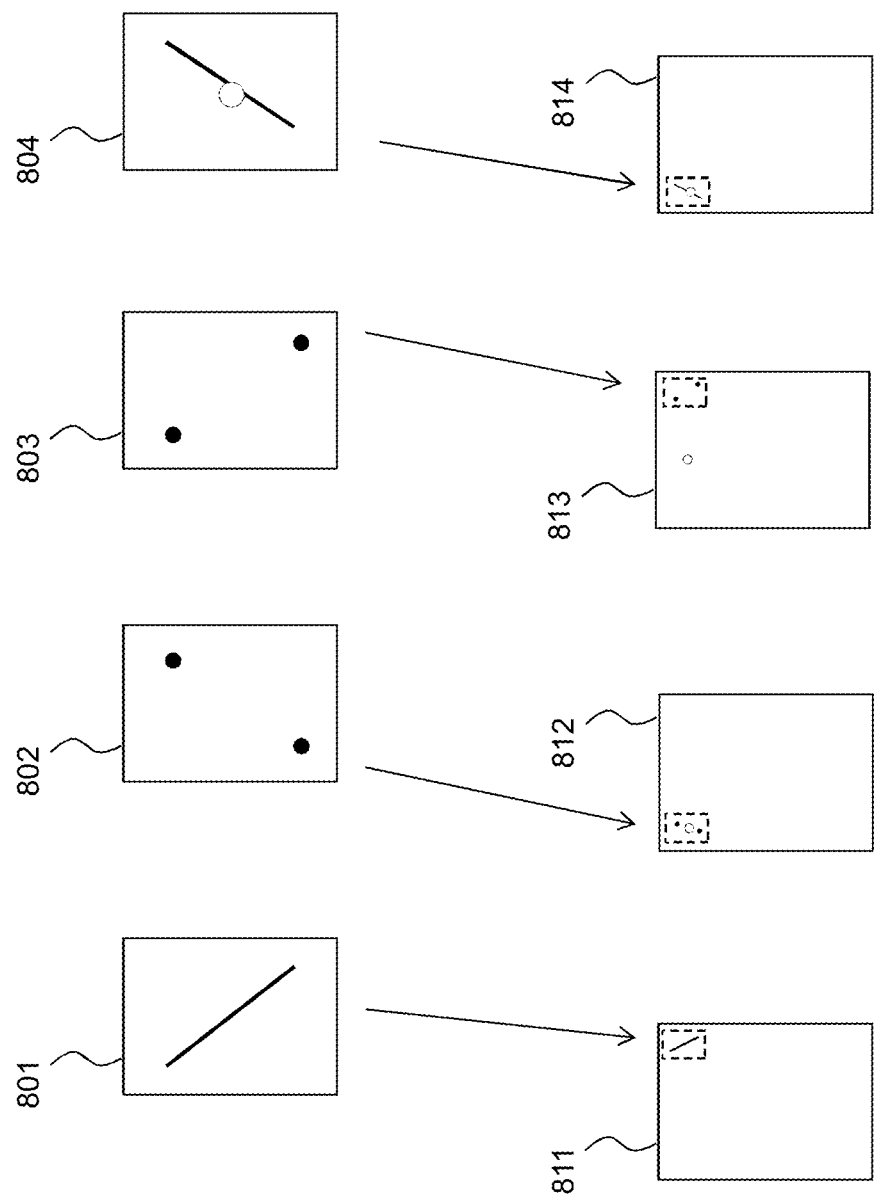
FIGS. 8-9 show digital finishing visualization images according to the present invention for a number of sheets of a document to be printed.

A first example is shown in FIG. 8. The number of sheets comprises a front sheet, one or more middle sheets and a back sheet which are intended to form a stapled document. For the front side 811 of the first sheet the control unit fetches a first digital stapling visualization image 801. For the back side 812 of the first sheet and the back side 812 of the one or more middle sheets the control unit fetches a second digital stapling visualization image 802. For the front side 813 of one or more middle sheets and the front side 813 of the back sheet the control unit fetches a third digital stapling visualization image 803. For the back side 814 of the last sheet the control unit fetches a fourth digital stapling visualization image 804.

For each fetched digital stapling visualization image a position is obtained in the appropriate digital image where to merge the fetched digital stapling visualization image with the digital image before printing.

For the first digital stapling visualization image 801 a right upper corner of the digital image of the front side 811 of the first sheet is obtained. For the second digital stapling visualization image 802 a left upper corner of the digital image of the back side 812 of the first sheet and the back side 812 of the one or more middle sheets is obtained. For the third digital stapling visualization image 803 a right upper corner of the digital image of the front side 813 of one or more middle sheets and the front side 813 of the back sheet is obtained. For the fourth digital stapling visualization image 804 a left upper corner of the digital image of the back side 814 of the last sheet is obtained.

According to an embodiment the at least one finishing visualization image—for example the black points in the second digital stapling visualization image 802 and the black points in the third digital stapling visualization image 803—may be enlarged to exaggerate the predetermined visual appearance of the result of the stapling step in or on the image receiving medium for sheet sides other than the front side 811 and other than the back side 814.

Figure 9:
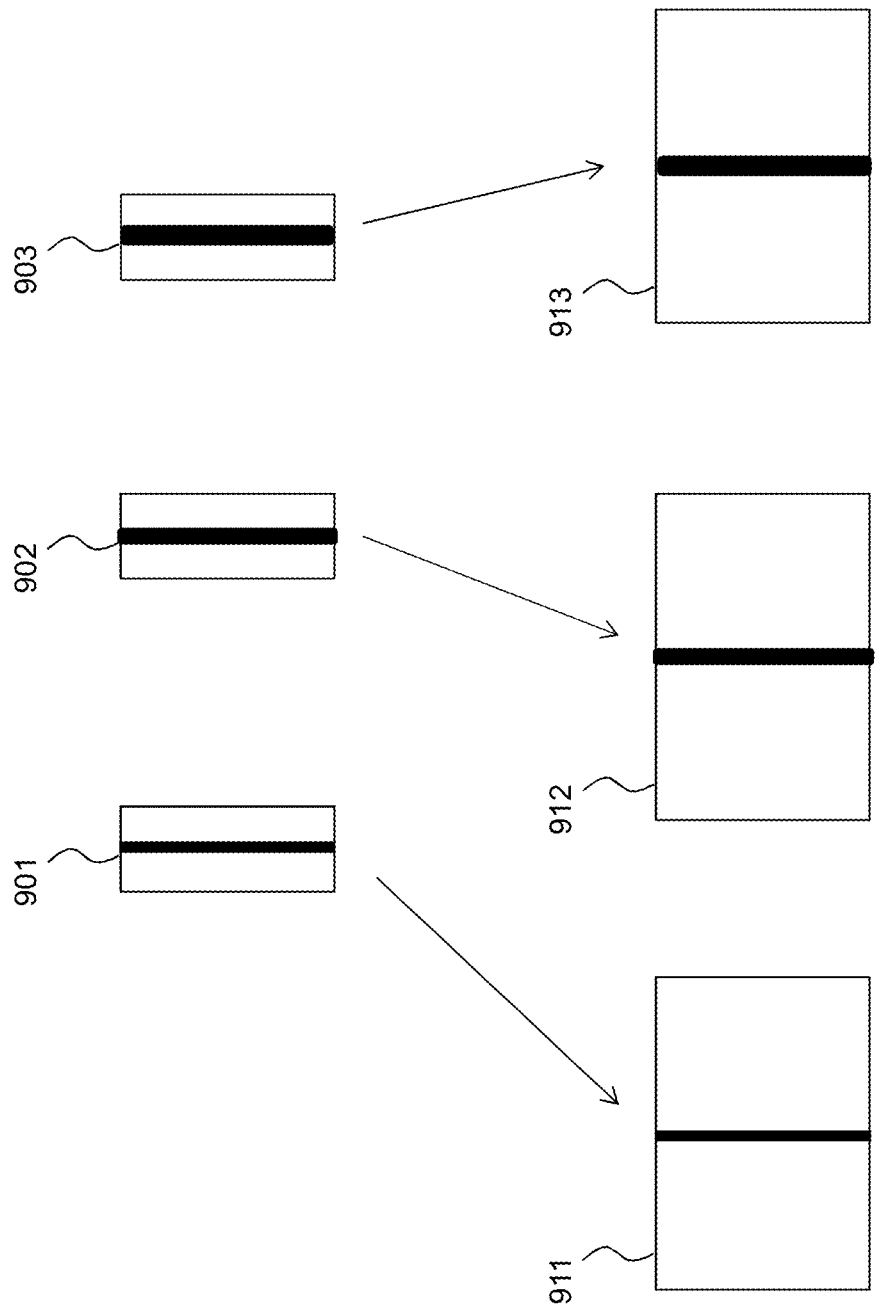

A second example is shown in FIG. 9. A number of sheets is intended to be folded into a booklet comprising a centerfold sheet 911, one or more in-between sheets 912 and a cover sheet 913. For each sheet one of a plurality of digital gutter visualization images 901, 902, 903 is used. For convenience reasons the number of in-between sheets 912 is considered to be one in this example. For the centerfold sheet 911 the control unit fetches a first digital gutter visualization image 901. For the in-between sheet 912 the control unit fetches a second digital gutter visualization image 902. For the cover sheet 913 the control unit fetches a third digital gutter visualization image 903. By using a plurality of digital gutter visualization images 901, 902, 903, each having a different width for the gutter representation, a gutter width variation in the booklet—which results when a real folding of the number of sheets is applied—is taken into account and visualized.

For each fetched digital gutter visualization image a mid-position is obtained in the appropriate digital image where to merge the fetched digital gutter visualization image with the appropriate digital image before printing.

Figure 10:
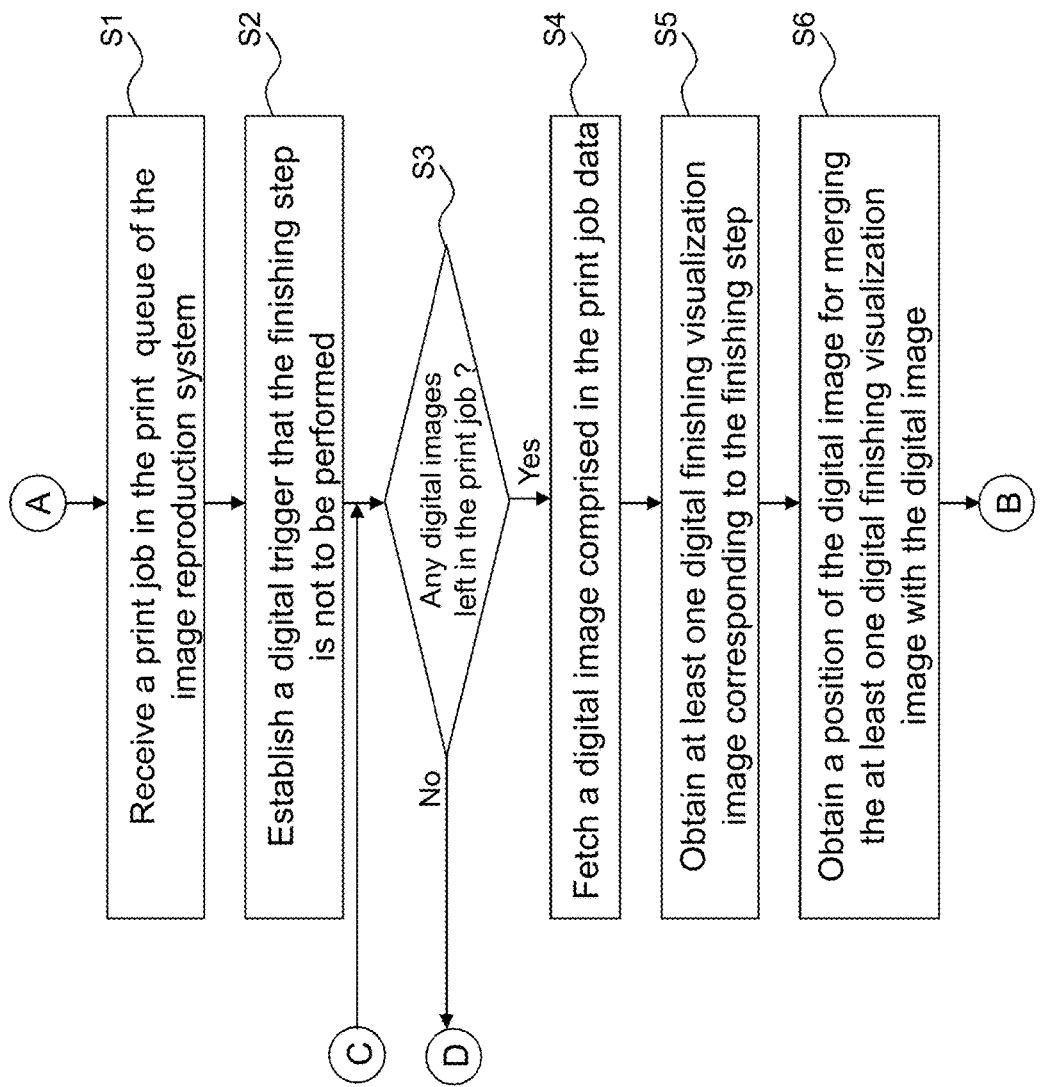
FIGS. 10-11 is a flow diagram illustrating the method according to the present invention.
Figure 11:
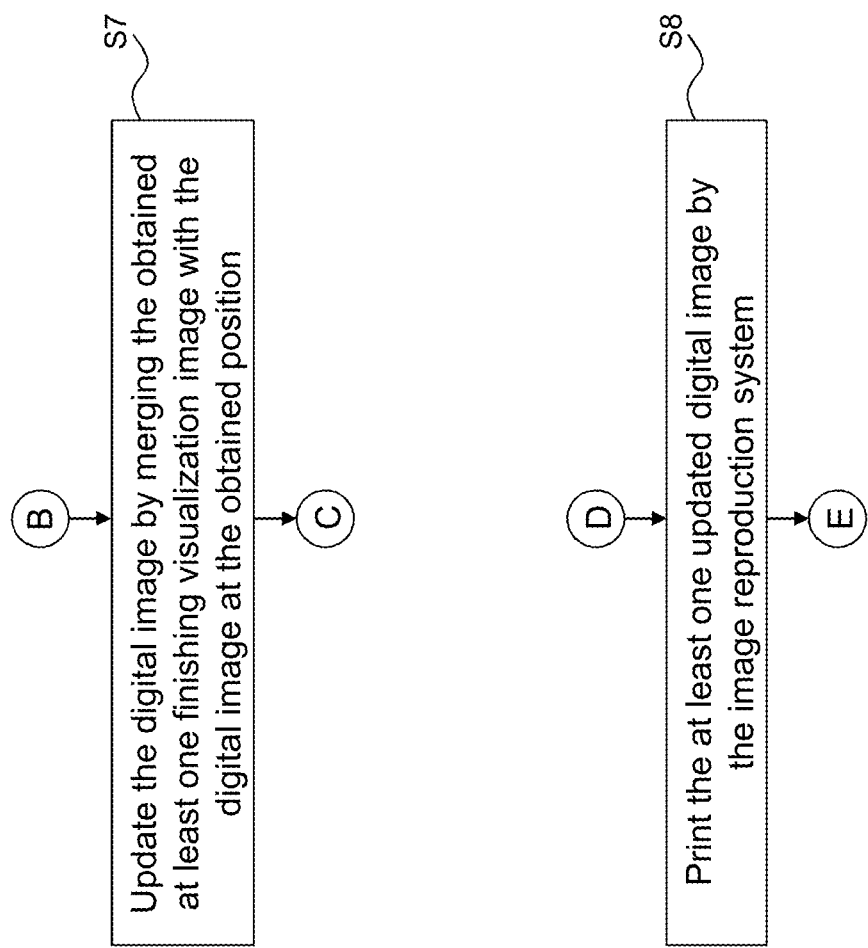

The steps of a representative example of the method according to the present invention have been shown in a flow diagram in FIG. 10 and FIG. 11.

In a first step S1 a new print job is received and added to the print queue of the image reproduction system. The print job specifies a printing step on an image receiving medium and a finishing step in or on the image receiving medium.

In a second step S2 a digital trigger is established by the control unit of the image reproduction system that the finishing step is not to be performed.

In a third step S3 it is checked if there are digital images left in the print job data of the print job which need to be treated. If so, the method proceeds to a fourth step S4. If not, the method proceeds via in-between point D to an eighth step S8 shown in FIG. 11.

In a fourth step S4 a digital image comprised in print job data of the print job is fetched.

In a fifth step S5 at least one digital finishing visualization image of a predetermined visual appearance of a result of the finishing step in or on the image receiving medium is obtained from memory of the control unit.

In a sixth step S6 a position of the digital image is obtained for merging the obtained at least one digital finishing visualization image with the digital image. The method proceeds via an in-between point B to a seventh step S7 shown in FIG. 11.

In the seventh step S7 the digital image is updated by merging the obtained at least one finishing visualization image with the digital image at the obtained position. The method returns via in-between point C to the third step S3.

In a final eighth step S8 the at least one updated digital image is printed by the image reproduction system. The method ends in an end point E.

The invention claimed is:

1. A method of printing a print job by an image reproduction system, the print job specifying a printing step on an image receiving medium and a finishing step in or on the image receiving medium, the method comprises the steps of
receiving the print job by the image reproduction system;
establishing a digital trigger that the finishing step is not to be performed;
for a digital image comprised in print job data of the print job
obtaining at least one digital finishing visualization image of a predetermined visual appearance of a result of the finishing step in or on the image receiving medium;
obtaining a position of the digital image for merging the obtained at least one digital finishing visualization image with the digital image;
updating the digital image by merging the obtained at least one digital finishing visualization image with the digital image at the obtained position; and
printing the updated digital image by the image reproduction system
wherein the step of obtaining a position of the digital image for merging the obtained at least one digital finishing visualization image with the digital image comprises the sub-step of receiving the position from a finisher configured to perform the finishing step.

2. Method according to claim 1, wherein the print job is at least one out of a first print job comprising a specification of the finishing step that does not result in printing any first auxiliary finishing mark in the printing step, and a second print job comprising a specification of the finishing step that does result in printing a second auxiliary finishing mark in the printing step, the second auxiliary finishing mark deviating qua form and/or qua position from the at least one digital finishing visualization image.

3. Method according to claim 1, wherein the at least one digital finishing visualization image exaggerates the predetermined visual appearance of the result of the finishing step in or on the image receiving medium.

4. Method according to claim 1, wherein the at least one digital finishing visualization image is printed completely inside the image boundaries of the digital image.

5. Method according to claim 1, wherein the at least one digital finishing visualization image represents a result of a finishing step for a number of sheets and the method comprises the step of printing at least one digital finishing visualization image on each sheet, wherein a digital finishing visualization image for the finishing step printed on one sheet differs from a digital finishing visualization image for the same finishing step printed on another sheet.

6. Method according to claim 1, wherein the trigger is at least one out of an external trigger received from outside of the image reproduction system and an internal trigger received from inside of the image reproduction system.

7. Method according to claim 6, wherein the external trigger is one out of an external trigger received from an offline finisher and an external trigger received by means of a user interface of the image reproduction system, the user interface configured to receive user instructions from a user of the image reproduction system.

8. Method according to claim 1, wherein the method comprises the step of rasterizing the digital image and the digital finishing visualization image before the updating step.

9. Method according to claim 1, wherein the step of obtaining the at least one digital finishing visualization image comprises the step of receiving image properties to be applied to the at least one digital finishing visualization image from a finisher which is capable to execute the finishing step.

10. An image reproduction system for processing a number of image reproduction jobs, comprising a controller adapted to perform the method according to claim 1.

11. The image reproduction system according to claim 10 comprising or connected to at least one finisher.

12. A non-transitory recording medium comprising computer-executable program code configured to instruct a computer to perform a method according to claim 1.

* * * * *